Feb. 16, 1932.   J. B. DES ROSIERS   1,845,583
SECTIONAL TIRE AND VEHICLE WHEEL THEREFOR
Filed July 20, 1927   5 Sheets-Sheet 1

John B. des Rosiers
INVENTOR
BY Thomas A. Jenckes Jr.
ATTORNEY

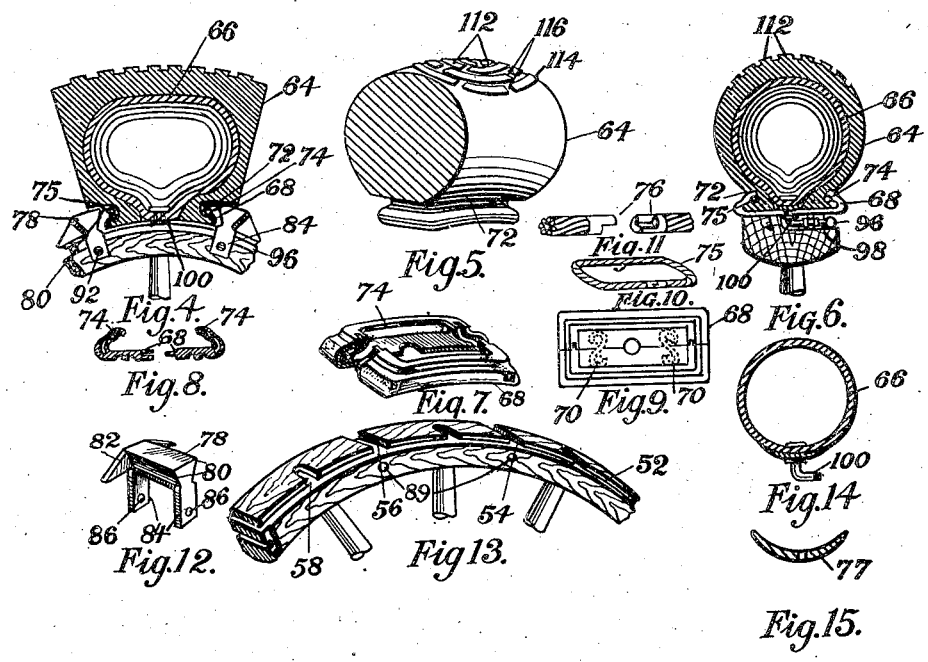

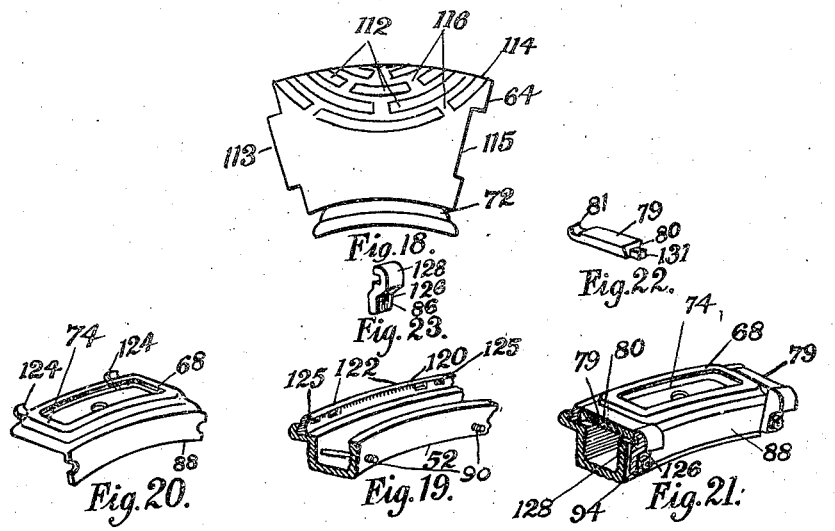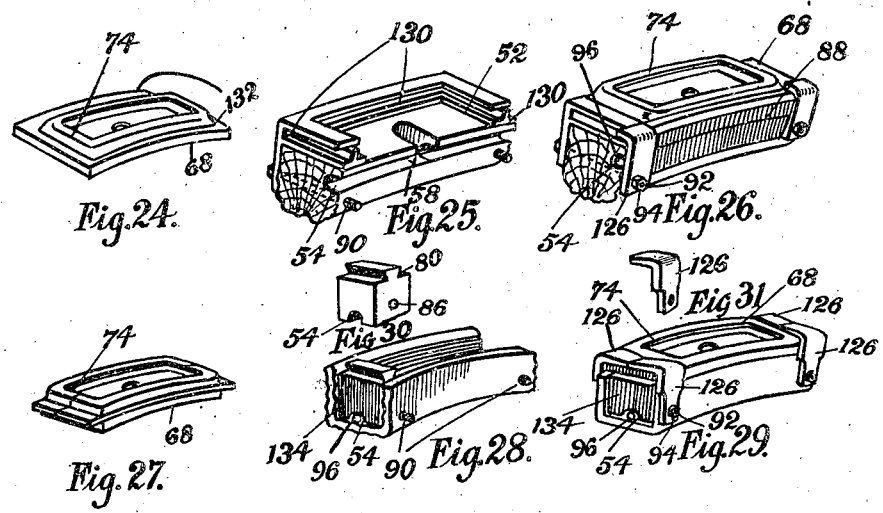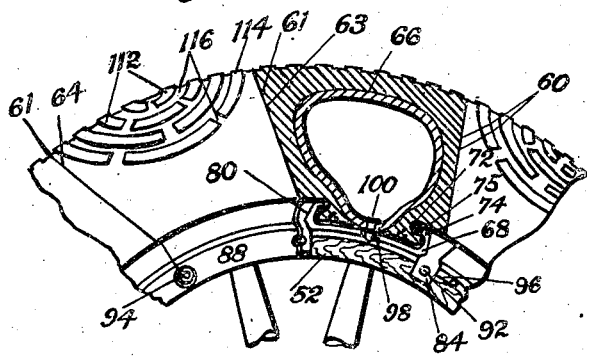

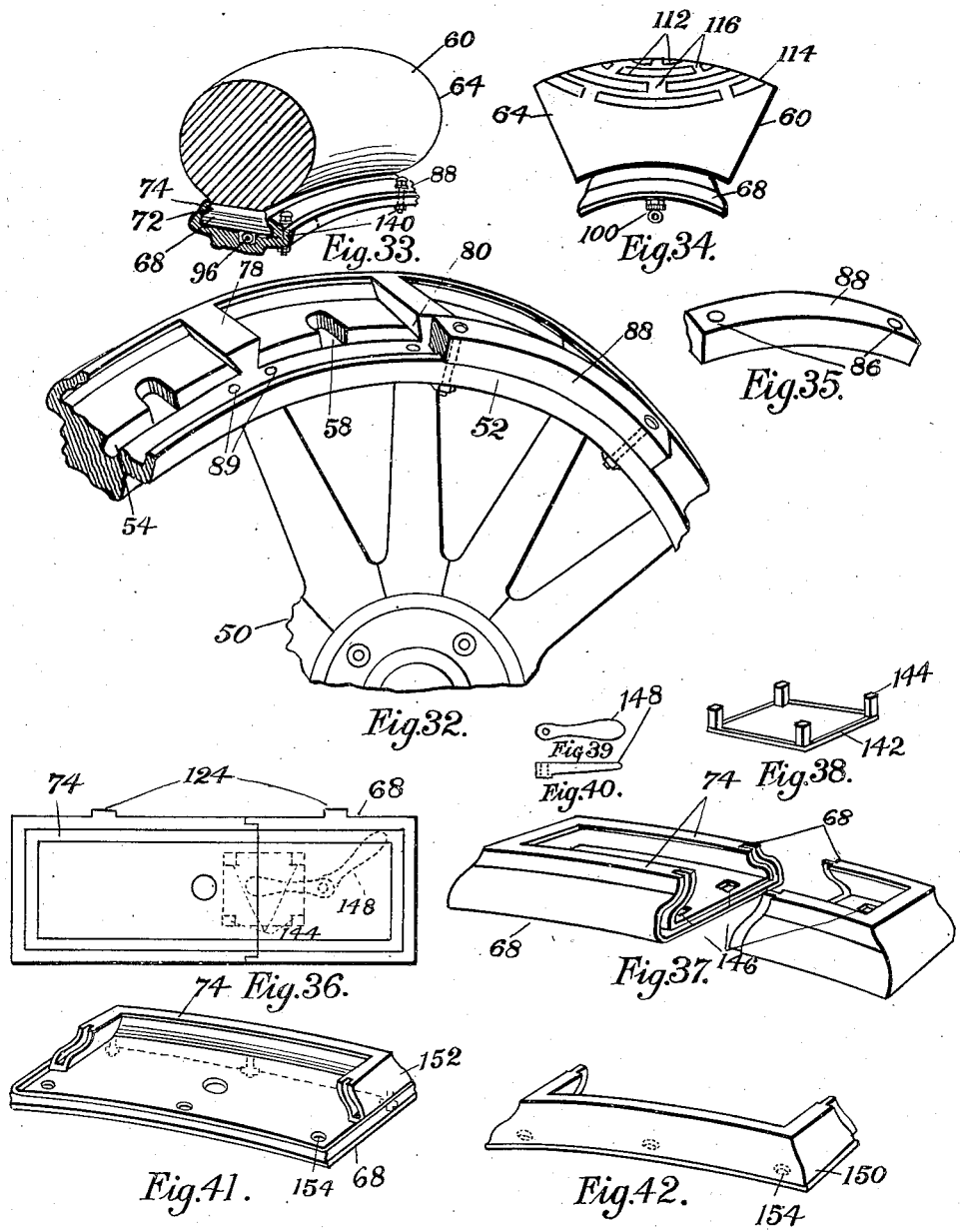

Feb. 16, 1932.   J. B. DES ROSIERS   1,845,583
SECTIONAL TIRE AND VEHICLE WHEEL THEREFOR
Filed July 20, 1927   5 Sheets-Sheet 5
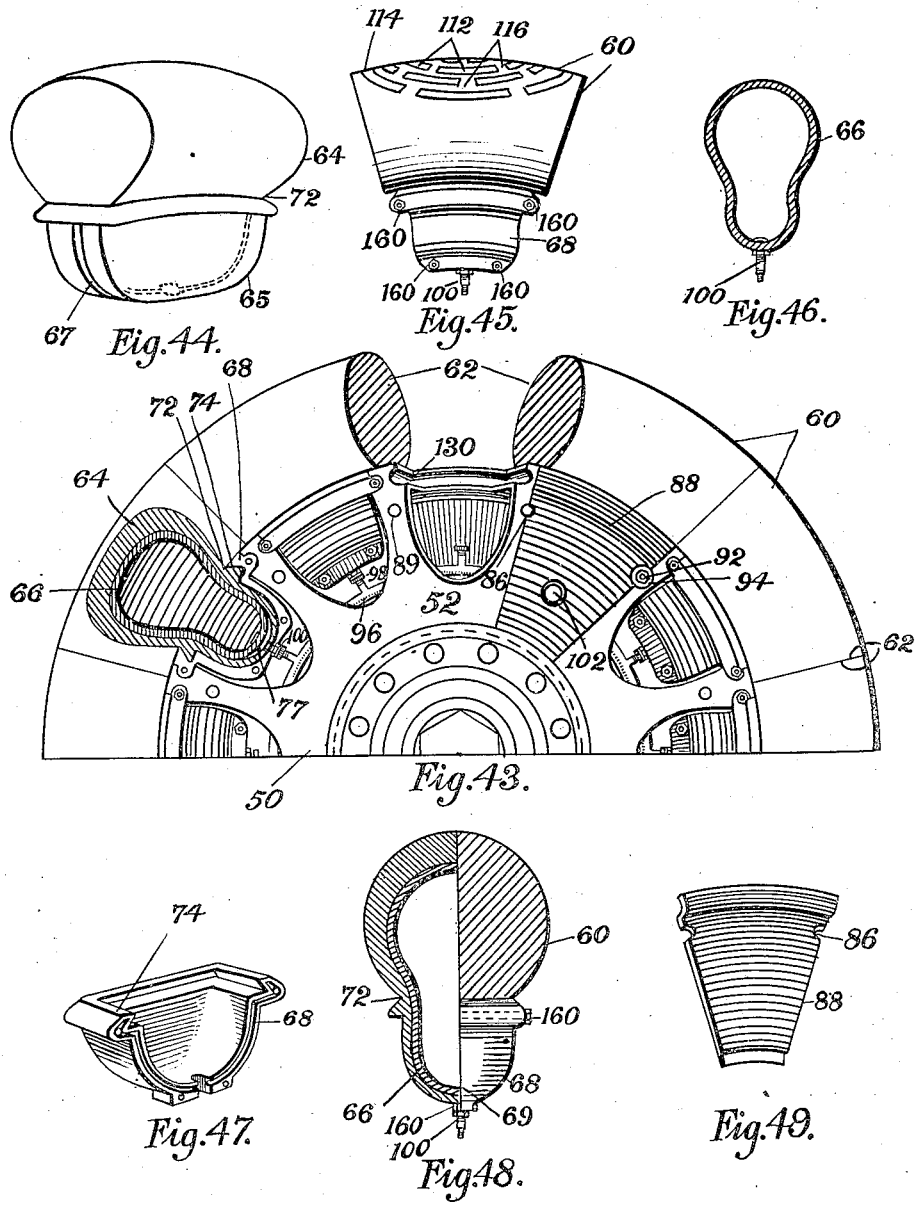
John B. DesRosiers   INVENTOR.
BY
Thomas A. Jenckes Jr.   ATTORNEY.

Patented Feb. 16, 1932

1,845,583

UNITED STATES PATENT OFFICE

JOHN B. DES ROSIERS, OF PROVIDENCE, RHODE ISLAND

SECTIONAL TIRE AND VEHICLE WHEEL THEREFOR

Application filed July 20, 1927. Serial No. 207,279.

My invention relates to vehicle wheels, and particularly to pneumatic tires therefor, composed of individually detachable sections.

While I am aware that others have provided so-called sectional tires, composed of a plurality of separate sections, most of these have been impractical for various reasons, and I believe I am the first to provide a sectional tire, wherein each section thereof includes substantially all of the elements of a normal tire, such as;—1. A separate shoe for each section; 2. A separate bladder or tube for each section; and 3. A separate rim for each section.

In addition, I believe I am the first to provide means to clamp the individual sections to the wheel felly in such a manner as to prevent circumferential movement of each individual section thereon, and simultaneously to prevent lateral movement of each individual section. In this manner I am enabled to so closely bind said tire sections together as to prevent dust entering between each individual section to chafe said sections in use.

In addition, I believe I am the first to provide a practical master valve and connecting flexible pipe to simultaneously pump air into each individual section, and permit an equalization of the amount of air throughout all individual sections.

A further object of my invention is to provide a novel type of tread surface, so designed as to prevent suction and its subsequent drawback on the progress of the vehicle and skidding.

As a result of my above forementioned, and later to be described improvements, I believe I provide for the first time a really practical sectional tire, preferably one which is both demountable and detachable. I propose to carry a plurality of sections already mounted on individual rims. In the event of a puncture, it is merely necessary to undo the bolts, take off the locking plates, when a flat tire section may be readily pulled out and a new one inserted without jacking the car. As a result, it is not necessary to carry complete spare tires and the process of replacing a tire becomes so simple that it can easily be done by a lady or a child. Even if one tire section should become flat, it is not absolutely essential to change it, as the weight of the car will be readily supported by sections adjacent to the flat section without mutilating the flat section.

Further objects of my invention are to cheapen the cost of manufacturing tires, as it is much easier to cast in a small mold a plurality of small sections than to cast a large complete shoe; and there is a further saving for if a second should be produced, it only consists of an amount of rubber small in comparison with the amount of rubber in a normal shoe. The molds and machinery necessary to manufacture my improved sectional tire are, of course, much smaller and less expensive to manufacture than the molds and machinery for manufacturing a normal shoe.

In a normal tire the body of air travels around and around, being forced forward by the compression of the tire against the ground. As there is no circumferential air travel in my tire, it is obvious that it will last much longer, due to the absence of air friction caused by said circumferential air travel. In a normal automobile tire it is forced to buck and overcome this rotating annulus of compressed air, whereas, employing my invention, as the first part of each section becomes compressed, it will force the air to the rear of the section, thereby tending to throw the tire and wheel forward. Due, therefore, to this peculiar effect of my invention, and due to the fact that my invention is no longer forced to buck against the rapidly rotating annulus of air, it is obvious that it will require much less power and much less gasoline to operate a vehicle equipped with my invention.

When a normal automobile tire strikes a protuberance, the air is thrown upward therein, and on surging back causes the car to make another bound. With my improved invention, this rebounding or rebouncing effect is eliminated.

These and such other objects of my invention as may hereinafter appear will be best understood from a description of the accompanying drawings which illustrate various embodiments thereof.

In the drawings, Fig. 1 is a partially distorted side elevation of an automobile wheel equipped with my invention, one of the tire sections therefor being removed and another one broken away to show the interior construction thereof.

Fig. 2 is a side elevation of the section removed from Fig. 1.

Fig. 3 is a side elevation of the locking plate and nuts employed to laterally lock the section to the felly.

Fig. 4 is a longitudinal sectional view partly shown in elevation of an attached tire section.

Fig. 5 is a perspective view of a sectional shoe.

Fig. 6 is a cross-sectional view taken through a shoe at the point of attachment of the valve.

Fig. 7 is a perspective view of the preferred form of split rim I employ.

Fig. 8 is a cross-sectional view thereof.

Fig. 9 is a plan view of the split rim in locked position, the tire section having been removed therefrom.

Fig. 10 is a perspective view of a flexible locking cord I preferably employ.

Fig. 11 is a detailed view showing the clasp I preferably employ thereon.

Fig. 12 is a perspective view of the clamp I preferably employ.

Fig. 13 is a perspective view of my preferred modified type of wheel felly.

Fig. 14 is a cross-sectional view of the bladder.

Fig. 15 is a cross-sectional view of the flap I preferably employ in each section.

Fig. 16 is a perspective view of the master pipe and valve I preferably employ.

Fig. 17 is a diagrammatic side elevation partly shown in section to illustrate the action of the air in each section to throw the car forward.

Fig. 18 is a side elevation of my preferred type of sectional shoe.

Figure 1:
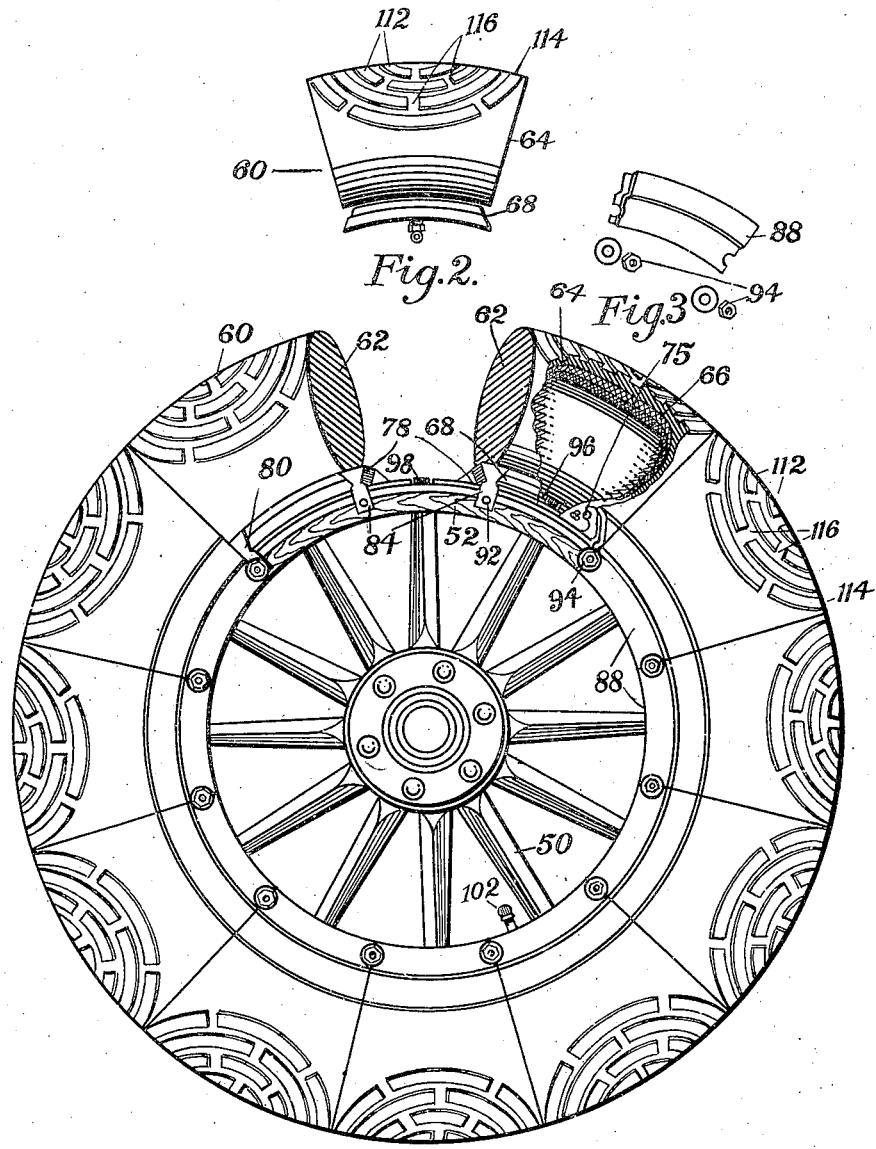

Figs. 19-23 are detailed views showing a modified form of felly and rim which I may employ; Fig. 19 being a fragmentary perspective view of a section of metal felly adapted to receive the attaching means of this embodiment; Fig. 20 being a perspective view of the rim thereof; Fig. 21 being a fragmentary perspective view of a rim in attached position on the felly; Fig. 22 being a perspective view of the cross clamp I preferably employ for this embodiment and Fig. 23 being a perspective view of a locking side clamp I preferably employ for this embodiment.

Figs. 24-26 are detailed views of a different type of clamping means I may employ; Fig. 24 being a perspective view of the rim I employ with this embodiment; Fig. 25 being a fragmentary view of a portion of the periphery of the felly modified for this embodiment; and Fig. 26 being a perspective view of a section of the rim attached thereto.

Figs. 27-31 are detailed views of a further embodiment of clamping means; Fig. 27 being a perspective view of the split rim I preferably employ with this embodiment; Fig. 28 being a fragmentary perspective view of a portion of the periphery of the felly modified for this embodiment; Fig. 29 being a fragmentary perspective view of a rim section in attached position on said felly; Fig. 30 being a detailed perspective view of an end clamp I employ with this embodiment; and Fig. 31 being a detailed perspective view of a side clamp I employ in this embodiment.

Figs. 32-35 are detailed views of a further embodiment of clamping means for my invention, wherein the cross clamps situated intermediate each section are preferably constructed integral with the felly; Fig. 32 being a perspective view of a portion of a periphery of a wheel; Fig. 33 being a fragmentary perspective view of a portion of the periphery of the felly, having a tire section attached thereto; Fig. 34 being a side elevation of an assembled tire section; and Fig. 35 being a perspective view of the locking plate I employ with this embodiment.

Figs. 36—40 show an alternative type of rim, which may be employed in this embodiment; Fig. 36 being a plan view of said rim in assembled position; Fig. 37 being a perspective view of said transversely split rim; Fig. 38 being a perspective view of the rim locking plate; and Fig. 39 and Fig. 40 being plan and side elevations respectively of the clamping handle I employ therewith.

Figs. 41 and 42 are additional perspective views of a further type of longitudinally split rim; Fig. 41 being a view of the base and integral rear side thereof; and Fig. 42 being a perspective view of the detached front side thereof.

Figs. 43-49 show a futher embodiment of my invention, wherein the tire bladders are enlarged and extended to a point much nearer the center of the wheel, usually substantially double the height of a normal tube; Fig. 43 being a side elevation partly shown in section of a disc wheel equipped with this type of my invention; Fig. 44 being a perspective view of a shoe I employ with this type; Fig. 45 being a side elevation of a detached section; Fig. 46 being a cross sectional view of the bladder I employ with this embodiment; Fig. 47 being a perspective view of the rear half of a split rim I employ with this embodiment; Fig. 48 being an end elevation partly shown in section with the rear half of the split rim thereof removed; and Fig. 49 being a perspective view of the locking plate I preferably employ in this embodiment.

Fig. 50 is a side elevation partially shown in section of a portion of a wheel felly showing a preferred embodiment of my invention wherein the flat ends of each section unit are inclined obliquely from the radial to prevent dirt, sand etc. from sifting radially down between the sections.

In the drawings, wherein like characters of reference generally indicate like parts throughout, 50 generally indicates an ordinary automobile wheel suitably equipped with my invention, having the usual felly 52 preferably modified as shown in Fig. 13 for the attachment thereto of the different parts of my invention. Said felly 52 is provided with a circumferential groove 54 in the outer front edge thereof for the reception of the master flexible pipe 96, the transverse grooves 56 spaced equidistantly on the periphery of said wheel amounts equal in distance to the length of the sections and the channels 58 leading from the circumferential groove 54 to substantially the center of said felly for the reception therein of the extensions from said master flexible pipe to the individual valves of each section bladder.

As stated, my invention includes a plurality of tire sections 60, in my preferred embodiment, twelve for each tire, preferably arcuately longitudinally bent, having the flat abutting ends 62 and composing when assembled a complete tire. Each section 60 includes a separate shoe 64, an oval bladder 66 therein, and an individual detachable rim 68 adapted to surround the lower end of each shoe for individual demountable securement to said felly. In the preferred embodiment shown in Figs. 1–18, said rim 68 is preferably split and is provided with means to clamp the lower end of the shoe 64 within said rim, in my preferred embodiment, said means comprising the S shape spring clamps 70 suitably sprung on pins projecting from underneath the rim 68; said shoe 64 is preferably provided with a circumferential groove 72 for the reception therein of the inwardly projecting circumferential flange 74 of the split rim 68. The flexible locking cord 75 is preferably provided for insertion in said groove 72 underneath said flange; said cord 75 being preferably provided with the joint 76 shown in detail in Fig. 11. A flexible locking cord 75 is adapted to lock the entire section 64 within its respective rim. In use after the tire section 64 has been deflated the cord 75 may first be readily removed and then the section 64 removed from its respective rim 68. In employing the locking cord 75 it is not found necessary to split the individual rim 68 but the tire may be readily removed from the individual rim after removal of the locking cord. The tube protecting flap 77 may be employed if desired.

In addition, I provide means to individually attach said sections to said felly and means to prevent circumferential movement of said rims and sections on said felly and lateral movement thereon. In my preferred embodiment said means comprises cross clamps 78 shown in detail in Fig. 12 adapted to be attached to said felly between each tire section in said transverse grooves 56, having inwardly beveled locking sides 80 adapted to overlap the edges of said section rims 68 to clamp them to said felly and secure them against circumferential movement thereon. To prevent rearward lateral movement of said rims, I provide the wings 82 projecting laterally from the rear ends of said clamps 78 adapted to abut the rear edges of said rims to prevent rearward lateral movement thereof. For attachment of said clamps 78 to said felly, they are provided with the inward projections 84 on each end thereof, adapted to straddle the felly and having the holes 86 therein. To lock the front edge of said sections against lateral movement, I provide the locking plates 88 of a length substantially equal to the length of each rim, and I provide locking bolts 90 projecting through the felly, terminating in the front threaded ends 92 and projecting through the holes 86 in said clamps 78 adapted to receive between adjacent bolts the locking plates 88, and I provide the lock nuts 94 adapted to be threaded on the ends 92 of said bolts 90 to simultaneously secure said locking plates 88 and clamps 78 to the transverse holes 89 in said felly.

I provide the master flexible pipe 96 provided with the means 98 projecting therefrom for individual attachment thereto of each individual bladder valve 100 and a master valve 102 for said master pipe, said master pipe being adapted to rest in said circumferential groove 54 on said felly and the means 98 to project to said valves 100 in the channels 58.

As I stated, I also provide a novel type of nonskid protuberances on the tread surface of each individual shoe composed of the rings 112 enclosed one within the other, the diameter of the outermost ring 114 being substantially the length of the shoe alternately, symmetrically broken at 116.

Fig. 18 shows an alternative form of shoe 64 I may employ, having the projection 113 extending transversely, diametrically across one end thereof and a cooperating depression 115 in the opposite end thereof, said projections 113 being adapted to register in a cooperating depression 115 on the adjacent section. These cooperating projections and depressions perform two functions. They serve to keep the sections radially in alignment, and in addition they provide a dam to prevent dirt working down between each section.

Figs. 19–23 show a modified form of felly and rim. In this embodiment the means to prevent each individual section from rearward displacement comprises the circumferential overlapping lip 120, having the holes 122 therein adapted to receive the rearward projections 124 from the rim 68, said lip 120 thus serving to lock said rim 68 to the felly 52. In this embodiment the locking plate 88 is formed integral with the front edge of the rim 68. In this embodiment the locking clamps consist of two pieces, the transverse portions 79, having the bevelled sides 80, and the rear end 81 adapted to register in the holes 125 in the overlapping lip 120, and the additional vertical side clamp 126, having the cupped upper end 128 adapted to overlap the front end 131 of said transverse clamp 79, and having the usual hole 86 in the lower end thereof for attachment to the bolt 90.

Figs. 24–26 show a further embodiment of my invention generally similar to the embodiment described in Figs. 19–23, and is particularly designed to provide a strong section tire unit attaching means for trucks. In this embodiment the felly 52 is divided into a plurality of sections equal in number to the tire sections, having the grooves 130 therein adapted to receive the edges 132 of the rims 68 therein, and be secured thereto by the clamps 126, somewhat similar in shape and function to side clamps 126 used in the embodiment shown in Fig. 21 and clamped over the side locking plates 88. It is thus obvious that as each rim 68 fits into its respective groove 130, it is locked to said felly and held against circumferential and lateral movement thereon.

The embodiment shown in Figs. 27–31 is generally similar to the embodiment shown in Figs. 24–26, but includes a longitudinally split rim 68. In this embodiment the clamping surfaces 80 are formed on the end clamps 134, adapted to be inserted at each end of the felly tire section, and secured thereto by the side clamps 126 on each side thereof and bolts 90.

The embodiment of my invention shown in Figs. 32–35 has the cross clamps 78 integrally formed on the periphery of the felly 52. In this embodiment, the locking plates 88 are adapted to be secured to the inner side of the felly by the radial bolts 140.

Figs. 36–40 show a modified form of transversely split rim, which may be employed in this embodiment, held together by the locking plate 142, provided with the legs 144 adapted to register in the cooperating holes 146 on each split section of said rim 68 and secured thereto by the handle 148 pivotable to a position over said locking plate 142. (Fig. 36.)

Figs. 41–42 illustrate an alternative form of longitudinally split rim 68, having the rear end and base constructed integral and the split front end 150 adapted to be detachably secured to said rear end 152 by the radially projecting bolts adapted to be inserted through the bolt holes 154.

Figs. 43–49 show an alternative form of sectional tire particularly adapted for use on trucks, wherein the size of the pneumatic portion of each bladder is substantially doubled and extended towards the center of the wheel preferably substantially twice the height of a normal shoe. In this embodiment the shoe 64 is provided with the downward extension 65 longitudinally split at 67 for the reception of the bladder 66 therein, and the bladder 66 then assumes the general pear shape shown in cross section in Fig. 46. In this embodiment the rim 68 is adapted to enclose the lower portion of the tube and tire and is also split at 69 and the front half is secured to the rear half thereof by the upper and lower sets of transverse bolts 160. In this embodiment the rims 68 are clamped to the modified felly by insertion in grooves 130 therein generally similar to the grooves employed in the embodiment shown in Figs. 24–26. In this embodiment the locking plate 88 preferably extends to a point substantially near the normal hub cap of the wheel and the master pipe 96 is located correspondingly nearer to the center of the wheel.

In the embodiment shown in Fig. 50 the flat ends 62 of each sectional unit are inclined obliquely from the radial, the overlapping ends 61 of each section unit thus forming a lock to prevent dirt and other things from sifting down through the channel 63 normally formed between adjacent section units.

In order to attach any of the embodiments, it is merely necessary to undo the lock nuts 94, take off the locking plates 88, and laterally withdraw the tire section 60 and replace it by a blown-up tire section. If it is desired to detach the rim 68 from its respective shoe 64, it is merely necessary to pull it out or to undo the appropriate clamping means 70 therefor, when a new tube 66 may, if desired, be inserted in said shoe.

As stated, it is no longer possible to have a rapidly rotating ring of air to over come in the revolution of the tire. Fig. 17 illustrates diagrammatically, as stated hitherto, how in advancement of the tire, the front part of the section is depressed, causing the air to bound to the rear of the section, thereby throwing the tire forward with the consequent reduction in the amount of power required to operate the vehicle, thus giving a fresh impulse to the revolution of each tire as each section comes in contact with the ground.

It is understood that my invention is not limited to the specific embodiments shown, and that various deviations may be made therefrom without departing from the spirit and scope of the appended claims.

What I claim is:—

1. In a tire section a shoe having a circumferential groove near the inner end thereof, a bladder contained within said shoe having a valve projecting inwardly therefrom, a detachable split rim surrounding the inner end of said shoe having an inwardly projecting flange registering in said groove, a flexible locking cord also registering in said groove underneath said flange, and means to secure said rim sections together around said shoe.

2. In a tire section a shoe having a circumferential groove near the inner end thereof, a bladder contained within said shoe, having a valve projecting inwardly therefrom, a rim surrounding the inner end of said shoe having an inwardly projecting flange registering in said groove and a flexible locking cord also registering in said groove underneath said flange.

3. In a vehicle wheel comprising a felly and a plurality of tire sections detachably mounted on separate rim sections demountably arranged in circumferential succession upon said felly, each tire section having a shoe having a circumferential groove near the lower end thereof, a bladder contained within said shoe having a valve projecting inwardly therefrom, the detachable split rim surrounding lower end of said shoe having an inwardly projecting flange registering in said groove and means to detachably secure said split rim sections together around said shoe to form an inflatable tire section unit and means to demountably secure said tire section units to said felly against circumferential and lateral movement.

4. In an assembly comprising a wheel felly, a tire having a series of inflatable chambers each comprising a separate shoe and a bladder contained within said shoe and an inflation valve for each bladder, a peripheral groove on said wheel felly and a master inflation pipe permanently mounted in said peripheral groove on said felly having means projecting therefrom and embedded in said felly detachably connectable to each individual bladder valve and having a master valve.

5. In an assembly comprising a wheel felly, a tire having a series of inflatable chambers each comprising a separate shoe and a bladder contained within said shoe and an inflation valve for each bladder, a peripheral groove on said wheel felly and a master inflation pipe permanently mounted in said peripheral groove on said felly, detachably connectable to each inflatable bladder and having a master valve.

6. In a vehicle wheel, comprising a felly and a plurality of tire sections mounted upon separate rim sections arranged in circumferential succession upon said felly, clamps for said rim sections attached to said felly between each tire section having inwardly bevelled locking sides overlapping the edges of said rim sections to clamp them to said felly and to secure them against circumferential movement thereon, wings projecting laterally from the rear ends thereof abutting the rear edges of said tire sections and projections on each end thereof straddling said felly having holes thereon, locking plates for the front sides of said sections and bolts simultaneously securing said locking plates and clamps to said felly.

In testimony whereof I affix my signature.

JOHN B. DES ROSIERS.